United States Patent
McManus et al.

(10) Patent No.: US 9,514,907 B2
(45) Date of Patent: Dec. 6, 2016

(54) MEMBER-TO-MEMBER FUSE CONNECTION

(71) Applicants: Patrick McManus, Cheyenne, WY (US); Jay Puckett, Laramie, WY (US); Jack Peterson, Littleton, CO (US)

(72) Inventors: Patrick McManus, Cheyenne, WY (US); Jay Puckett, Laramie, WY (US); Jack Peterson, Littleton, CO (US)

(73) Assignee: Novel Structures, LLC, Cheyenne, WY (US)

( * ) Notice: Subject to any disclaimer, the term of this patent is extended or adjusted under 35 U.S.C. 154(b) by 658 days.

(21) Appl. No.: 14/014,018

(22) Filed: Aug. 29, 2013

(65) Prior Publication Data

US 2014/0062648 A1   Mar. 6, 2014

Related U.S. Application Data

(60) Provisional application No. 61/695,141, filed on Aug. 30, 2012, provisional application No. 61/734,175, filed on Dec. 6, 2012.

(51) Int. Cl.
| | |
|---|---|
| *E04H 9/02* | (2006.01) |
| *H01H 85/00* | (2006.01) |
| *E04B 1/24* | (2006.01) |
| *H01H 85/12* | (2006.01) |
| *H01H 85/20* | (2006.01) |
| *H01H 85/10* | (2006.01) |
| *H01H 85/165* | (2006.01) |

(52) U.S. Cl.
CPC ........ *H01H 85/0017* (2013.01); *E04B 1/2403* (2013.01); *E04H 9/02* (2013.01); *E04H 9/028* (2013.01); *H01H 85/12* (2013.01); *H01H 85/20* (2013.01); *H01H 85/10* (2013.01); *H01H 85/165* (2013.01); *Y10T 403/11* (2015.01); *Y10T 403/4602* (2015.01)

(58) Field of Classification Search
CPC ................... E04B 1/2403; E04B 2001/2415; E04B 2001/2448; E04B 2001/2442; E04B 2001/2445; Y10T 403/11; Y10T 3/4602; E04H 9/02; E04H 9/024; E04H 9/028
USPC ....... 52/98, 167.1, 167.3, 655.1, 281; 403/2, 403/286
See application file for complete search history.

(56) References Cited

U.S. PATENT DOCUMENTS

| | | | | |
|---|---|---|---|---|
| 1,945,925 | A * | 2/1934 | Stiefel | E04B 1/2608 403/2 |
| RE22,905 | E * | 8/1947 | Scheyer | E04B 1/2403 403/2 |
| 3,304,031 | A * | 2/1967 | Mulquin | B64F 1/06 244/63 |
| 3,846,030 | A * | 11/1974 | Katt | F16B 7/0426 285/4 |
| 3,960,458 | A * | 6/1976 | Sato | E04B 1/2403 403/189 |

(Continued)

*Primary Examiner* — Joshua J Michener
*Assistant Examiner* — Matthew Gitlin
(74) *Attorney, Agent, or Firm* — Novel Structures, LLC; Patrick McManus

(57) ABSTRACT

A member-to-member connection bracket comprising a first connection member for coupling the connection bracket to a first structural member, a second connection member for coupling the connection bracket to a second structural member; and a fuse member disposed between the first connection member and the second connection member, the fuse member comprising at least one of hinge locations. The at least one hinge location provides inelastic deformation at a pre-determined load and the pre-determined load is less than the elastic yield load of a first structural member and a second structural member. The hinge locations may have a reduced thickness. The fuse member may have a tubular cross-section. A connection utilizing the member-to-member connection bracket is also included.

15 Claims, 17 Drawing Sheets

(56) References Cited

U.S. PATENT DOCUMENTS

| | | | | |
|---|---|---|---|---|
| 4,074,947 A * | 2/1978 | Matake | ................ | E04B 1/2403 403/189 |
| 4,490,062 A * | 12/1984 | Chisholm | ............... | E04H 12/22 29/897 |
| 4,905,436 A * | 3/1990 | Matsuo | ................... | E04B 1/215 403/174 |
| 5,595,040 A * | 1/1997 | Chen | .................... | E04B 1/2403 52/167.1 |
| 5,913,794 A * | 6/1999 | Chen | .................... | E04B 1/2403 52/167.1 |
| 6,474,902 B1 * | 11/2002 | Beauvoir | ............. | E04B 1/2403 403/187 |
| 6,739,099 B2 * | 5/2004 | Takeuchi | .............. | E04B 1/2403 403/403 |
| 7,497,054 B2 * | 3/2009 | Takeuchi | .............. | E04B 1/2403 403/403 |
| 2002/0100229 A1 * | 8/2002 | Chen | .................... | E04B 1/2403 52/167.1 |
| 2004/0244330 A1 * | 12/2004 | Takeuchi | .............. | E04B 1/2403 52/831 |
| 2006/0144006 A1 * | 7/2006 | Suzuki | .................. | E04B 1/2403 52/655.1 |
| 2013/0001383 A1 * | 1/2013 | Jay | ........................ | E04B 1/2403 248/201 |
| 2015/0159362 A1 * | 6/2015 | Pryor | ................... | E04B 1/2403 52/98 |

* cited by examiner

MEMBER-TO-MEMBER FUSE CONNECTION

CROSS-REFERENCE TO RELATED APPLICATIONS

This application claims the benefit of U.S. Provisional Patent Application No. 61/695,141, filed Aug. 30, 2012 and also claims the benefit of U.S. Provisional Patent Application No. 61/734,175 filed Dec. 6, 2012, the entire disclosures of which are hereby incorporated by reference.

BACKGROUND OF THE INVENTION

Field of the Invention

The present invention relates to a bracket used to facilitate a member-to-member connection for structural load resisting systems, such as, but not limited to, seismic and progressive collapse structural load resisting systems.

Description of Related Art

A conventional brace member-to-gusset plate connection 500 is shown in FIG. 1. This type of connection has been used for many years, but is not typically implemented when seismic or other dynamic loading conditions require the connection to sustain inelastic deformation in the components connecting the brace member to the gusset plate to absorb and dissipate the dynamic forces to reduce or eliminate catastrophic failures. In the case of conventional connection 500 between a brace member 502 and a gusset plate 504 to provide lateral bracing at the intersection of a beam 510a to a column 512a, the connecting component typically comprises steel plates or hot rolled shapes such as angles or channels 506 and 508 coupled to the gusset plate 504 and configured to be bolted or welded to the brace member 502.

Another conventional structural connection 520 is illustrated in FIG. 2. Connection 520 is commonly referred to as a WT connection and has been used for many years. WT connection 520 may be used to connect a beam 510b to column 512b and uses a top WT section 522 and a bottom WT section 524 welded or bolted to the beam flanges 526a and 526b and column 512b to provide a "moment" connection or "fixed end" connection. Again, WT connection 520 is not a connection typically designed to sustain inelastic deformation in the top WT 522 and bottom WT 524 during seismic or other dynamic loading conditions. In the case of a moment connection between a beam member and column member, the WT connection typically comprises a pair of T-shaped brackets (top WT 522 and bottom WT 524) formed by cutting a wide flange (I-shaped) member usually in half, although the T-shaped brackets may be otherwise formed, such as by casting, welding, or other fabrication.

FIG. 3 illustrates a plastic WT connection 520' which is a variation of the conventional WT connection 520 whereby the top WT section 522 and the bottom WT section 524 are shimmed with shim 528 to allow for plastic displacement of the WT sections toward or away from the face of the support column as beam 510b undergoes a rotation caused by dynamic or other forces. In the design of WT connection 520', the top and bottom WT sections 522 and 524 are sized to be "weaker" than the beam such that rotation of the beam 510b in relation to the column 512b providing a displacement X is accommodated primarily through deformation of the WT components 522 and 524. It is known that research has shown that the portions of flange 530a of top WT section 522 and flange 530b of bottom WT section 524 which are in contact with shims 528 translate parallel to a face 532 of column 512 to accommodate relatively large deformations in the WT components 522 and 524. In addition, significant axial forces develop in the flanges 530a and 530b of the WT components 522 and 524 under large deformations which are difficult to model and estimate through analysis and design.

Thus, known and widely used conventional member-to-member connections are generally not designed to accommodate the unique forces experienced at a joint during seismic or other dynamic loading conditions which require inelastic deformation of members of the joint to absorb and dissipate the load to prevent catastrophic failure. In periods of significant seismic or dynamic loading, most existing connections result in failure and damage to the primary structural members as the connections are often designed to be stronger than the structural member itself. In such events, damage to the primary structural members would result in demolition of the frame and the supported building.

To provide some inelastic deformation in a connection, existing connections have been modified using shims to allow for inelastic deformations, but these connections have been shown to result in additional transverse loading and an unpredictable load path through the connection. This unpredictability is undesirable for structural analysts and designers as it creates an uncertainty in the capacity and performance of a structural connection.

Thus, there is a need in the art for a static structural member-to-member connection that at least (1) predictably provides a known zone of plastic deformation and capacity, (2) includes a known force distribution allowing predictability and certainty for designers, and (3) provides the point of failure so that the connection members and not the primary members experience the damage and can be replaced thereby eliminating the need to demolish an entire structure after an extreme dynamic loading event.

SUMMARY OF THE INVENTION

The present invention is directed toward a connection bracket including a fuse element that provides a known static load capacity and a known failure point that experiences inelastic deformation at one or more inelastic hinge locations and member-to-member connections that include the fuse element. The fuse element generally comprises a first web connection member coupled to the fuse mechanism. The fuse element may comprise a flange connection member for embodiments configured to simulate a WT member or another web element member depending upon the configuration of the members to be connected. The fuse element may include one of a plurality of geometric configurations which provides specific and known hinge locations and conditions.

In one embodiment, the fuse element has a "Y" shape which comprises a first web member, a first flange fuse wall wherein the first web member is coupled proximate the center of the first flange fuse wall and substantially perpendicular thereto. In addition, the fuse element includes two web fuse walls, one web fuse wall coupled at each end of the flange fuse wall and the web fuse wall extending opposite the web and substantially perpendicular to the flange fuse wall. The fuse element further includes two flanges, each flange extending perpendicular and outwardly relative to the respective web fuse wall.

Other embodiments comprise fuse elements resembling having a tubular cross-section with the tube having circular, rectangular cross-section, or other geometric cross-section such as a hexagon or octagon. The web plate may extend from either the sidewall of the tubular fuse element or a corner, depending upon the failure characteristics desired by the designer. Other shapes and the usage of stiffeners in the fuse element are also within the scope of the present invention.

In use, one or more brackets may be disposed at one or both ends of brace members, beams, or columns throughout the structural frame within a structure that may encounter a seismic or other similar event. During a seismic event, the fuse elements within the bracket incur inelastic deformation in one or more fuse elements. The inelastic deformation of the fuse elements operate to absorb the seismic forces and displacements thereby preserving the elastic integrity of the braces, beams, columns, gusset plates or other primary members and components. This type of structural fused system is different than systems presently used and those used in past applications where a major event typically results in damage to primary members and subsequently may require demolition of the frame and supported building.

In one implementation, the unique geometry of the bracket allows for deformation parallel to a member (i.e. a brace or beam) primarily through rotations and translations of the fuse elements within the component rather than through axial deformations of the member. The unique geometry allows for deformation parallel to the member without an associated need for translation of the bracket components perpendicular to the member at the point of anchorage to the support is necessary in the known connections. Also reduced are the axial forces within the bracket fuse and flange elements, thereby reducing the forces in the fasteners and other elements within the structure required to achieve the desired component deformation (e.g., bolts, beams, columns, braces, etc.).

In another embodiment, the length, thickness, transition curvature and other geometry of the fuse elements can be proportioned to result in one, two, three, four or more hinge locations to accommodate energy being absorbed and dissipated through inelastic deformations.

In another embodiment, material, including, but not limited to elastomer, polymers and reinforced polymers, concrete or cementitious grout or other known materials may be placed in the void enclosed by the fuse element, the bracket, or bracket and support to provide increased elastic stiffness, inelastic stiffness, and/or damping.

The bracket may be formed from metal, primarily structural steel, through known fabrication processes such as a cast bracket, a bracket built up of welded shapes, a machined bracket, a bracket formed from cold bending of plates, an extruded or hot rolled bracket, a bracket formed from the laminating of components of similar or dissimilar materials, or a bracket of similar geometry from other fabrication or manufacturing processes. In one embodiment, the connection bracket of the present invention is of unitary construction. However, other known materials and manufacturing processes shall be within the scope of the present invention.

Other aspects and advantages of the present invention will be apparent from the following detailed description of the preferred embodiments and the accompanying drawing figures.

BRIEF DESCRIPTION OF THE SEVERAL VIEWS OF THE DRAWING

The accompanying drawings form a part of the specification and are to be read in conjunction therewith, in which like reference numerals are employed to indicate like or similar parts in the various views.

DETAILED DESCRIPTION OF THE INVENTION

The following detailed description of the present invention references the accompanying drawing figures that illustrate specific embodiments in which the invention can be practiced. The embodiments are intended to describe aspects of the present invention in sufficient detail to enable those skilled in the art to practice the invention. Other embodiments can be utilized and changes can be made without departing from the spirit and scope of the present invention. The present invention is defined by the appended claims and, therefore, the description is not to be taken in a limiting sense and shall not limit the scope of equivalents to which such claims are entitled.

Figure 1:
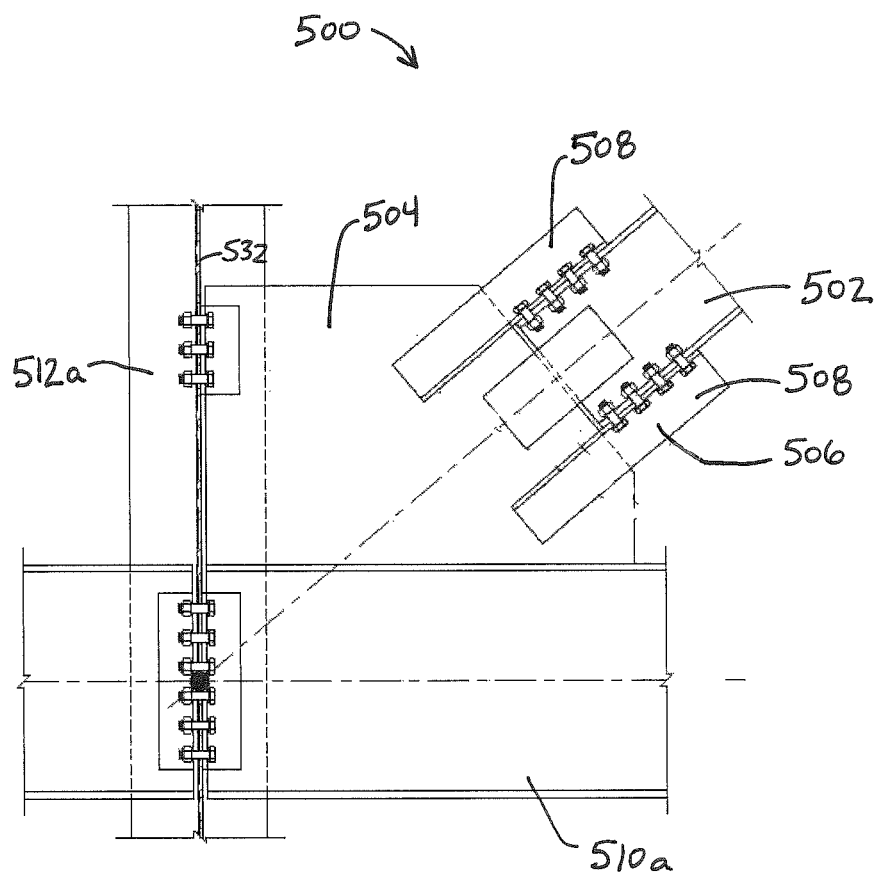
FIG. 1 is a side view of a known prior art connection.
Figure 2:
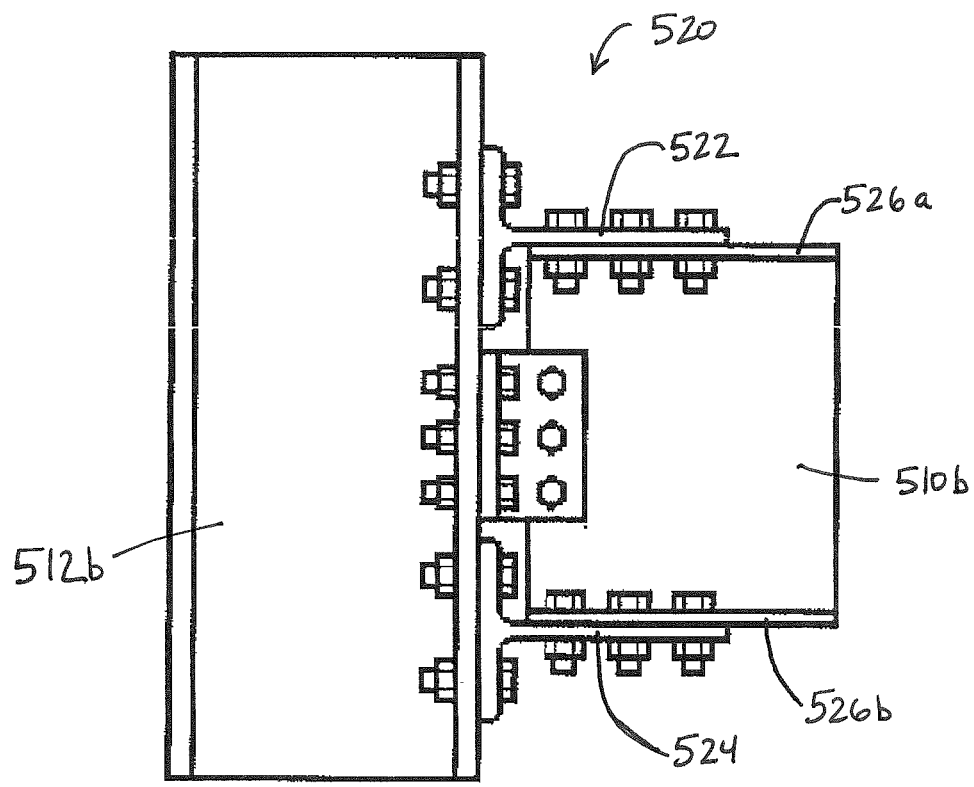
FIG. 2 is a side view of another known prior art connection.
Figure 3:
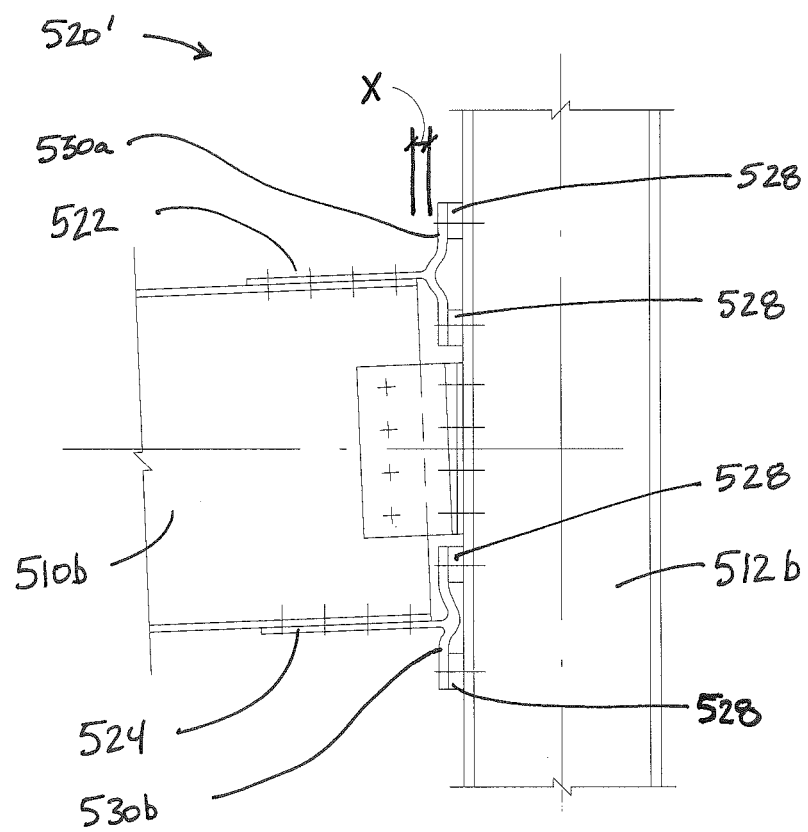
FIG. 3 is a side view of a variation of the connection of FIG. 2 including shims being used to space WT sections from the face of a column.
Figure 4:
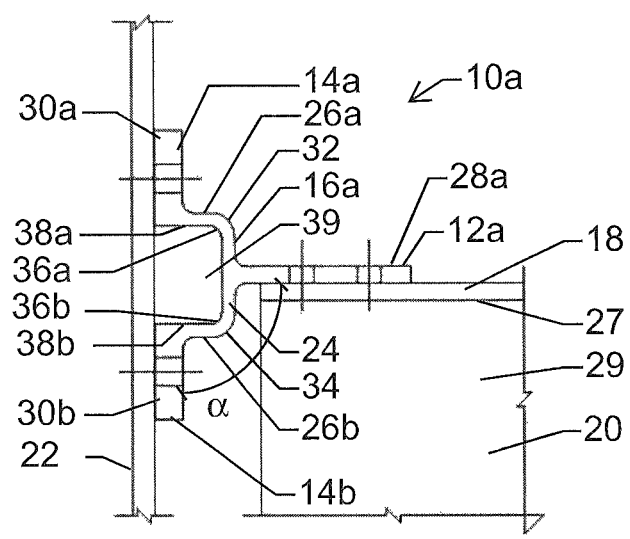
FIG. 4 is a side view of an embodiment of a member-to-member connection bracket in accordance with the teachings of the present invention.

As illustrated in FIG. 4, a connection bracket 10 of the present invention is shown wherein connection bracket 10 includes a first connection member 12, a second connection member 14 and a fuse member 16 disposed between the first and second connection members 12 and 14. Connection bracket 10 is a member-to-member connection for structural load resisting systems.

FIG. 4 shows an embodiment of connection bracket 10a having a Y-shaped fuse member 16a which is configured to connect a top for bottom flange 18 of a structural member 20 to a perpendicular support member 22, most commonly a beam 20 to column 22 connection. Fuse member 16a includes a flange fuse element 24 and a first web fuse element 26a and a second web fuse element 26b.

First connection member 12a is a web connection member 28a configured to be connected to an element parallel to the web connection member 28a, such as a flange of a beam when connection bracket 10a is in a horizontal orientation (as shown) or a beam web when connection bracket 10a is in a vertical orientation. Second connection member 14a comprises a first flange member 30a and a second flange member 30b. Flange fuse element 24 has a first end 32 and a second end 34. Web connection member 28a intersects flange fuse element 24 proximate the middle of flange fuse element 24 between ends 32 and 34. First web fuse element 26a has a first end 36a and a second end 38a and first end 36a is coupled to or integral with first end 32 and first web fuse element extends away from web connection member 28a and is substantially perpendicular to flange fuse element 24. Similarly, second web fuse element 26b has a first end 36b and a second end 38b and first end 36b is coupled to or integral with second end 34 and extends away from web connection member 28a and is substantially perpendicular to flange fuse element 24. A radius of the transition between the web fuse elements 26a, 26b and flange fuse element 24 may be proportioned to create a substantially circular or elliptical fuse element connecting first connection member 12 and second connection member 14.

Flange fuse element 24 and web fuse elements 26a and 26b may be configured to develop one or more plastic hinge at a location along a width of the fuse elements. A plastic hinge generally is a location of localized material behavior wherein the loads and stresses experienced by the fuse element causes an inelastic deformation and yield. At this point, the location of the plastic hinge experiences a permanent deformation and a localized change in material stiffness. The locations of the hinges can be pre-determined by having defined areas, such as notches or reductions in wall thickness, or the entire fuse member may have a load capacity which is weaker than the structural members and so the localized plastic hinge occurs at locations necessary to carry the type and magnitude of loads applied. One fuse element may include multiple plastic hinge locations. The more plastic hinges that occur, the greater the ability for connection bracket 10 to absorb and dissipate dynamic loading. However, the plastic hinges are to be localized to within the fuse elements. As shown in FIG. 4, possible hinge locations 66 may be located at any locations within the fuse members 24, 26a and 26b where the stresses experienced exceeds the yield stress of the material.

Connection bracket 10a includes flange members 30a and 30b wherein each flange member is located at second end 38a and 38b of first and second web fuse elements 26a and 26b respectively. Flange members 30a and 30b extend outwardly from second ends 38a and 38b and are substantially perpendicular to web fuse elements 26a and 26b. Flange fuse element 24, web fuse elements 26a and 26b, flange members 30a and 30b and web connection member 28a may have a length that is substantially identical. Furthermore, web connection member 28a may be orientated at an angle α with respect to flange member 30a and 30b. As shown in FIG. 4, angle α may be around ninety (90) degrees. However, web connection member 28a may be skewed with respect to flange members 30a and 30b wherein angle α may be between zero and one-hundred-eighty (0-180) degrees, with a common range being between forty-five and one-hundred-thirty-five (45-135) degrees.

Flange members 30a and 30b and web connection member 28a may have bolt apertures (not shown) cut therethrough as known in the art to facilitate a bolted connection to beam 20 or column 22. Alternatively, the members may not have holes and be configured for a welded connection as known in the art. An alternative embodiment of connection bracket 10a (not shown) may include a single flange plate which may be the substantial equivalent of joining the two flange sections in the middle of the connection bracket. Similarly, flange members 30a and 30b may be extended inwardly to form an integral member. Flange fuse element 24 and web fuse elements 26a and 26b, and/or connection members 20 and 22 may totally or partially define a void 39 that may be filled with material, including, but not limited to elastomer, polymers and fiber reinforced polymers, concrete or cementitious grout, piezoelectric or other known materials to provide increased elastic stiffness, inelastic stiffness, and/or damping.

Figure 5:
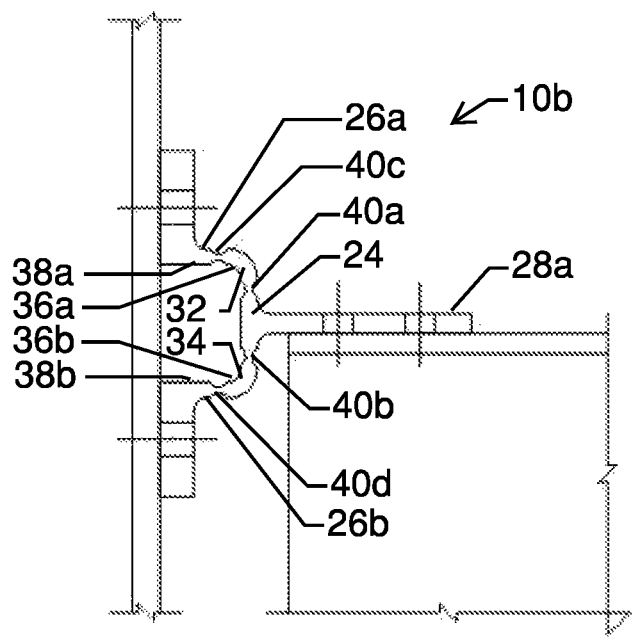
FIG. 5 is a side view of a variation of the member-to-member connection bracket in FIG. 4 that includes the hinge locations being of a reduced thickness in accordance with the teachings of the present invention.

FIG. 5 illustrates another embodiment of connection, bracket 10b similar to connection bracket 10a shown in FIG. 4, but further comprising a plurality of reduced thickness fuse element 40. A fuse element may also be the location of the hinge, or localized area of inelastic deformation. As shown in FIG. 5, flange fuse element 24 includes first reduced thickness fuse element 40a between web connection member 28a and first end 32 and reduced thickness fuse element 40b between web connection member 28a and second end 34. First web fuse element 26a includes a third reduced thickness fuse element 40c between ends 36a and 38a. Second web fuse element 26b includes a fourth reduced thickness fuse element 40d between ends 36b and 38b. The web fuse elements 26 are the location where a plastic hinge may develop upon application of sufficient force to the connection bracket 10b. The present invention shall include embodiments having more or less reduced thickness fuse elements 40 depending on the needs of a designer.

Figure 6:
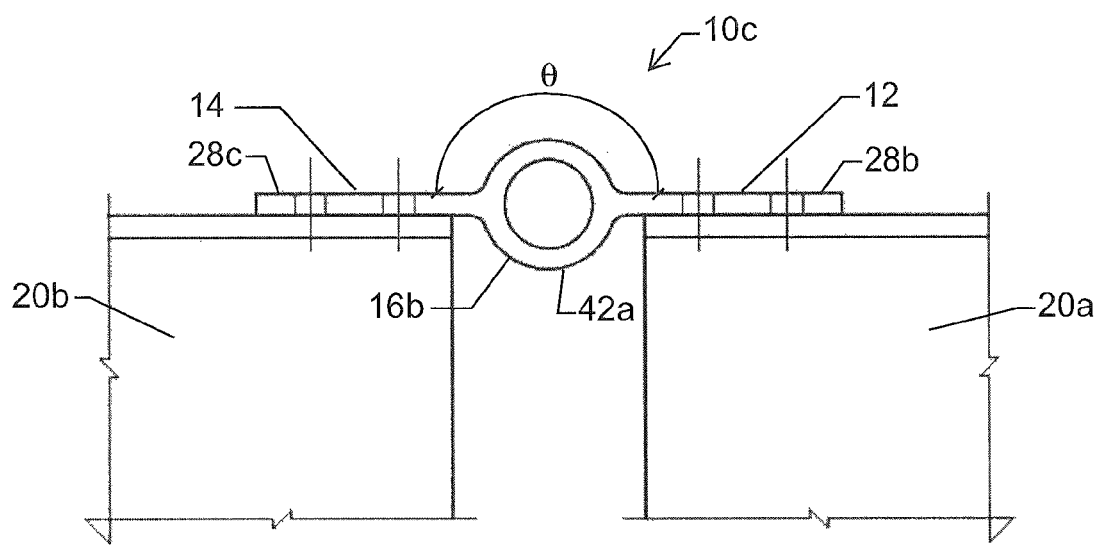
FIG. 6 is a side view of an embodiment of a member-to-member connection bracket in accordance with the teachings of the present invention.

FIG. 6 illustrates another embodiment of connection bracket 10c wherein first connection member 12 is a first web connection member 28b, second connection member 14 is a second web connection member 28c, and fuse member 16b is a fuse tube 42. As further shown in FIG. 6, fuse tube 42a has a circular cross-section. Connection bracket 10c is used to connect beam 20a to beam 20b. In addition, first web connection member 28b and second web connection member 28c are orientated at angle θ. Angle θ may range from ninety to one-hundred-eighty (90-180) degrees, with angle θ preferably being between one-hundred fifty and one-hundred eighty (150-180) degrees. Angle θ being less than one-hundred-eighty (180) degrees may allow connection bracket 10c to connect sloped beams (not shown).

Figure 7:
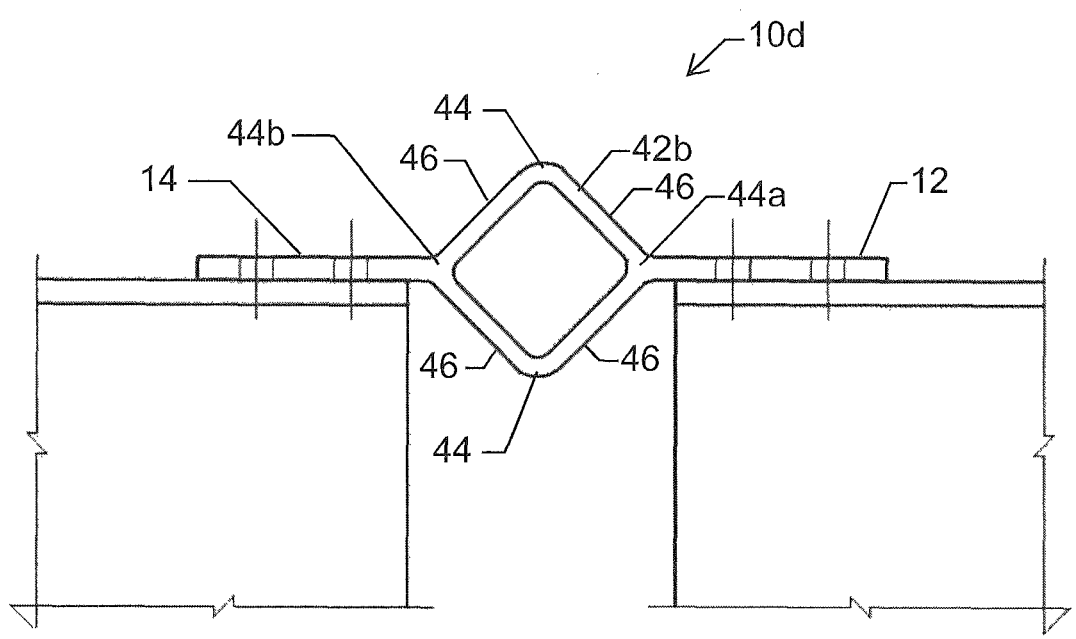
FIG. 7 is a side view of an embodiment of a member-to-member connection bracket in accordance with the teachings of the present invention.
Figure 8:
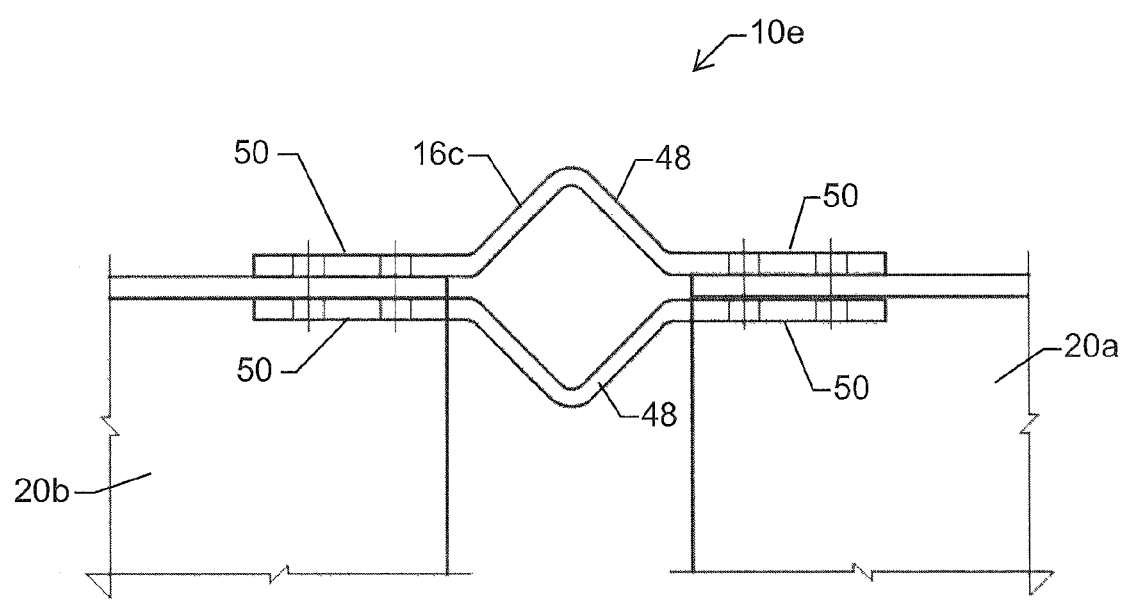
FIG. 8 is a side view of an embodiment of a member-to-member connection bracket in accordance with the teachings of the present invention.
Figure 9:
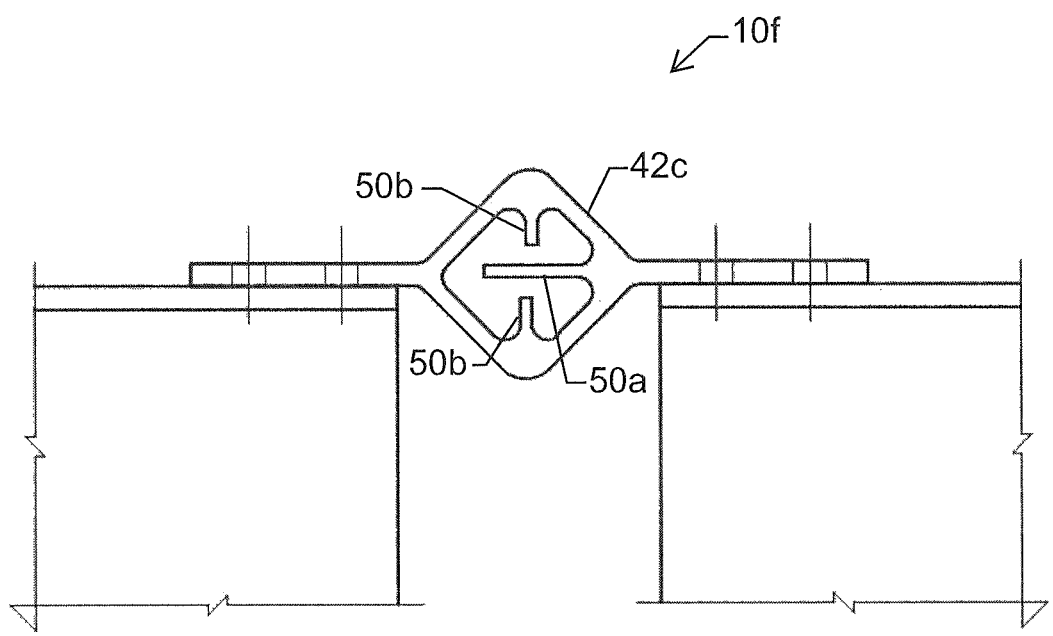
FIG. 9 is a side view of a variation of the member-to-member connection bracket in FIG. 7 that includes stiffeners within the fuse member in accordance with the teachings of the present invention.

FIG. 7 illustrates another embodiment of connection bracket 10d which is similar to the connection bracket 10c shown in FIG. 6. As shown, connection bracket 10d may have fuse tube 42b having a rectangular cross-section having four corners 44 and four sidewalls 46 wherein corners 44a and 44b are coupled to first connection member 12 and second connection member 14 respectively. FIG. 8 illustrates connection bracket 10e, which is a variation of connection bracket 10d wherein fuse member 16c comprises two opposing "V" shape members 48 wherein the ends of each "V" are coupled to or integral with a plate member 50 which sandwich beam 20a and beam 20b respectively. FIG. 9 illustrates connection bracket 10f, which is a variation of connection bracket 10d wherein fuse member 16b is a fuse tube 42c that further comprises one or more stiffening members 50. Stiffening members 50 serve to limit translations and/or modify stiffness at specific translations. As shown in FIG. 9, fuse tube 42c of connection bracket 10f may include a first stiffening member 50a parallel to the connection members 12 and 14 and a second stiffening member 50b perpendicular to connection members 12 and 14. Variations of the configuration of stiffening members 50a and 50b are within the scope of the present invention. One embodiment includes stiffeners 50b being split allowing stiffener 50a to pass through as shown in FIG. 9, stiffener 50a including a slot (not shown) defined therein and stiffener 50b being configured to pass through the slot, or other similar configurations. Another embodiment (not shown) may include one or more stiffeners 50 spanning between and coupled to opposing sidewalls 46. At least one end of a stiffener may be disposed a certain distance from the fuse elements such that forces are only delivered to the stiffeners when the free ends of the stiffeners come into contact with the fuse elements subsequent to large deformations within the bracket.

Figure 10:
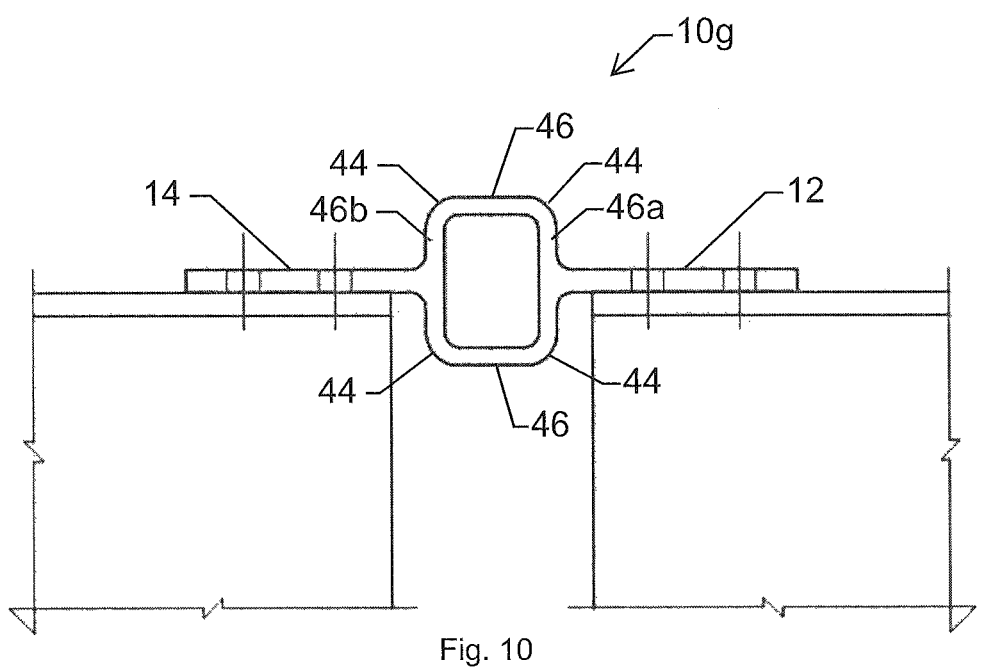
FIG. 10 is a side view of an embodiment of a member-to-member connection bracket in accordance with the teachings of the present invention.

FIG. 10 illustrates connection bracket 10g, which is similar to connection bracket 10d except first connection member 12 is coupled to sidewall 46a and second connection member 14 is coupled to sidewall 46b. The stiffeners limit translations in both directions to a limited value based upon the design geometry.

Figure 11:
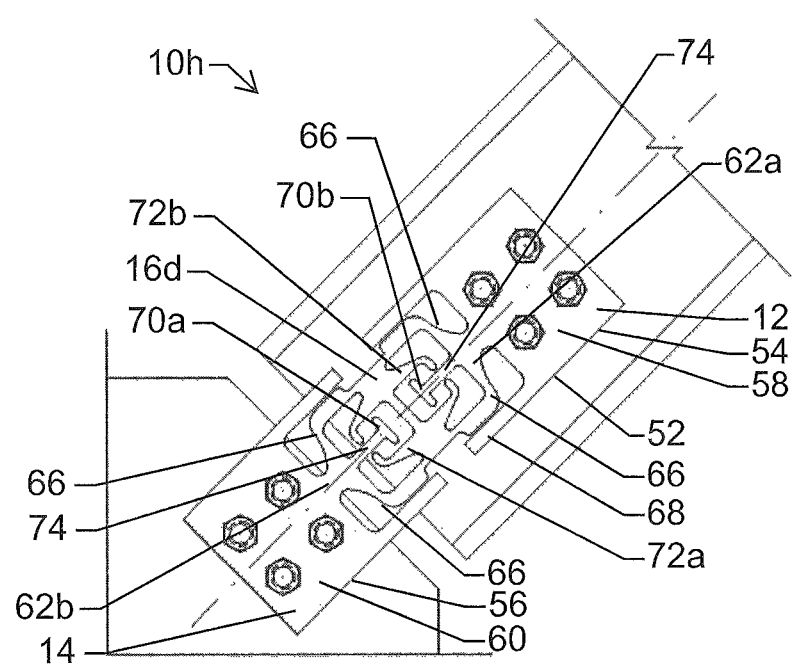
FIG. 11 is a side view of an embodiment of a member-to-member connection bracket in accordance with the teachings of the present invention.

FIG. 11 illustrates connection bracket 10h which includes a plate 52 having a first end 54 and a second end 56. Plate 52 may have a uniform thickness. First connection member 12 is a first connection portion 58 of plate 52 proximate first end 54 and second connection member 14 is a second connection portion 60 of plate 52 proximate second end 56 of plate 52. Connection bracket 10h includes fuse member 16d being a portion of plate 52 having strategically placed voids providing a known failure path through the fuse member 16d. Fuse member 16d has a first flange fuse element 62a and a second flange fuse element 62b wherein first and second flange fuse elements 62a and 62b are opposing with a distance therebetween. Fuse member 16d further comprises a first web fuse element 64a and a second web fuse element 64b spanning between flange fuse element 62a and 62b. As shown, first web fuse element 64a may span between one end of first flange fuse element 62a and its opposing end of second flange fuse element 62b. Similarly, second web fuse element 64b may span between the other end of first flange fuse element 62a and its opposing end of second flange fuse element 62b. This configuration substantially forms a box defined by the fuse members 62 and 64 of fuse member 16d wherein one or more hinge locations 66 may be located proximate the corners defined by the intersections of fuse members 62 and 64. Guide elements 68 may be disposed outward of fuse member 16d and extending toward a middle of connection bracket 10g as shown. Guide elements guide the translation of fuse member 16 during an extreme dynamic loading event.

Figure 12:
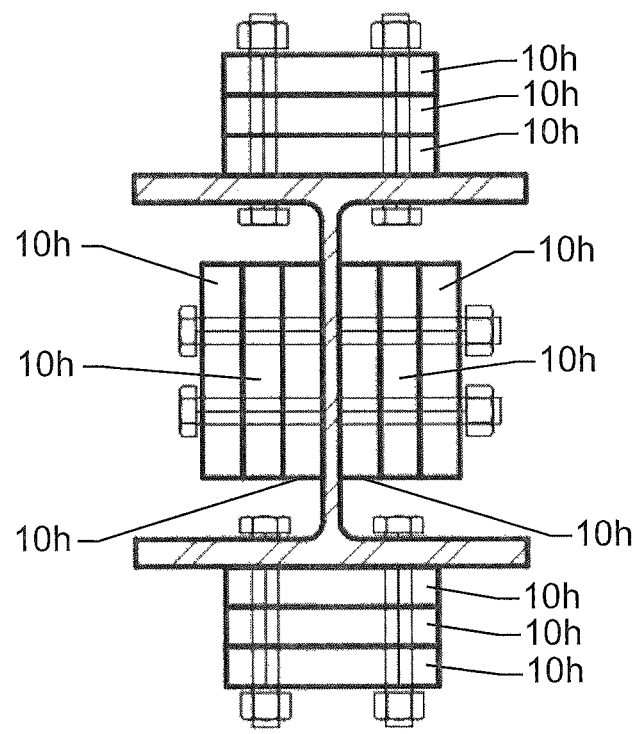
FIG. 12 is a section view of a member-to-member connection that utilizes a plurality of the member-to-member connection bracket of FIG. 11 in accordance with the teachings of the present invention.

Fuse member 16d may also include stiffening elements to stiffen the connections in tension and compression. As shown, one or more compression stiffening elements 70a and 70b may extend toward a center of fuse member 16d from flange fuse elements 62a and 62b as shown. Compression stiffening elements 70a and 70b may have a "T" shape with the wider end disposed toward the center of fuse member 16d as shown. Similarly tension stiffening element 72a and 72b may be disposed on web guides 64a and 64b and configured to define a gap 74 on either side of compression stiffening elements 70a and 70b as shown. Gap 74 may be less that the width of the wide end of the "T"-shaped compression stiffening elements 70a and 70b. At least one end of a stiffening element may be disposed a certain distance from the fuse elements such that forces are only delivered to the stiffening elements when the free ends of the stiffening elements come into contact with the fuse elements subsequent to large deformations within the bracket. FIG. 12 illustrates one embodiment of using connection bracket 10h wherein connection bracket 10h is manufactured with a known connection strength and multiple brackets 10h may be sistered together to provide the required connection strength. In addition, any of the connection brackets of the present invention may be similarly configured wherein two or more connection brackets are combined or "sistered" as described above to provide the desired connection strength and desired yield capacity.

Connection bracket 10 is preferably a monolithically cast bracket; however, any process for assembling or fabricating a bracket with similar geometric characteristics may be used. Connection bracket 10 may also be made from steel, aluminum, plastic, fiber reinforced plastic, composites, or any material with sufficient toughness and ductility to achieve the intended performance. Further, while examples are described with respect to one or more specific types of loading such as seismic loading, the described connections and structural devices can be used for other types of dynamic or static loading including blast, wind, thermal, gravity, soil loads (including those resulting from soil displacements), and other known environmental loading conditions.

Figure 13:
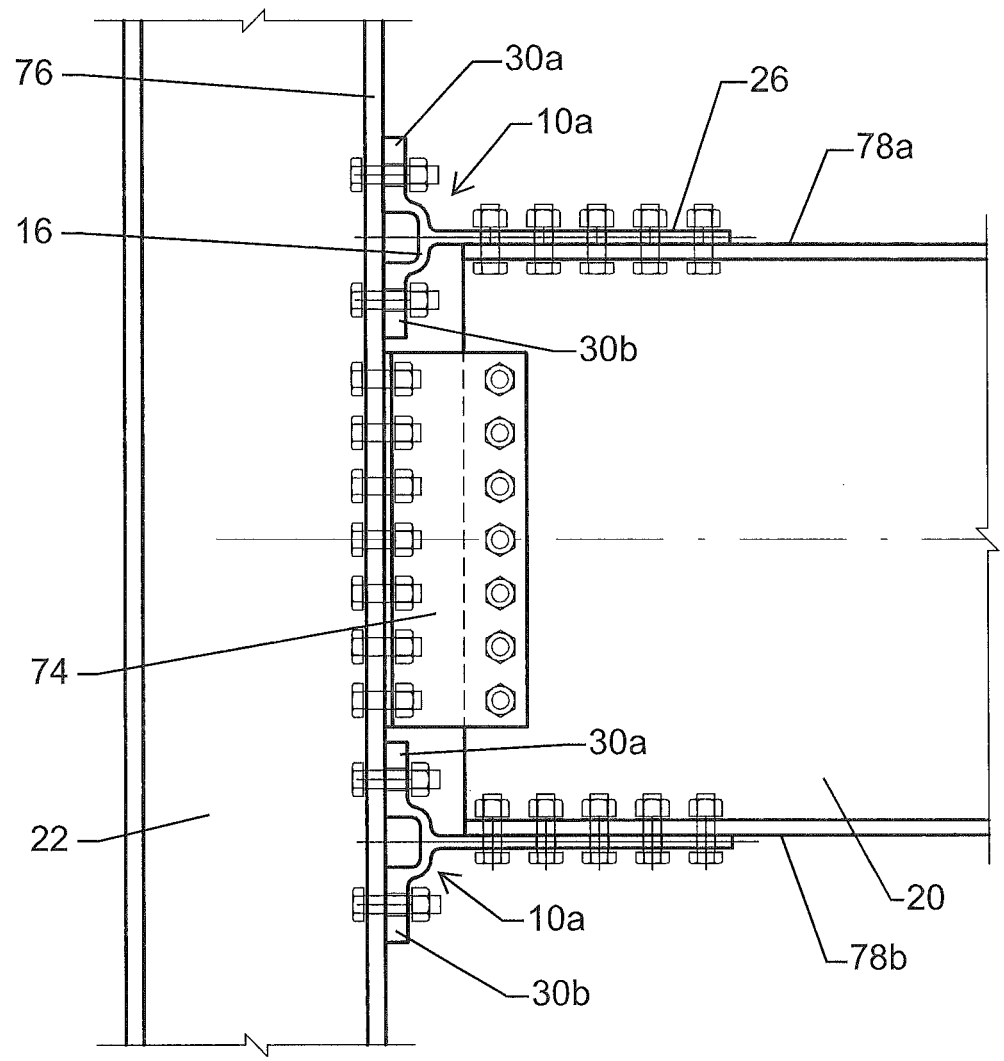
FIG. 13 is a side view of a member-to-member connection that utilizes the member-to-member connection bracket of FIG. 4 in accordance with the teachings of the present invention.

In use, there are a number of applications for such connection brackets 10 being used to connect brace members, beams, and columns or any combination. FIG. 13 illustrates one application of connection bracket 10 wherein two connection brackets 10a are used to connect beam 20 to column 22 in addition to shear connection 74. Connection brackets 10 are disposed to create a moment connection between beam 20 and column 22 that resists rotation of the connection up to a designed fuse deformation load. The fuse deformation load is less than the elastic capacity of the structural member, in this example beam 20 and column 22. Flange members 30a and 30b are coupled to flange 76 of column 22 as shown and known in the art. In addition, web connection member 26 is coupled a top flange 78a and a bottom flange 78b of beam 20. The connection bracket 10 may be bolted or welded to the structural members at the connection. In an alternative construction, fuse member 16 could be directly connected to the beam 20 and/or column by welding or other methods such that the flange connection member or web connection member could be eliminated.

Figure 14:
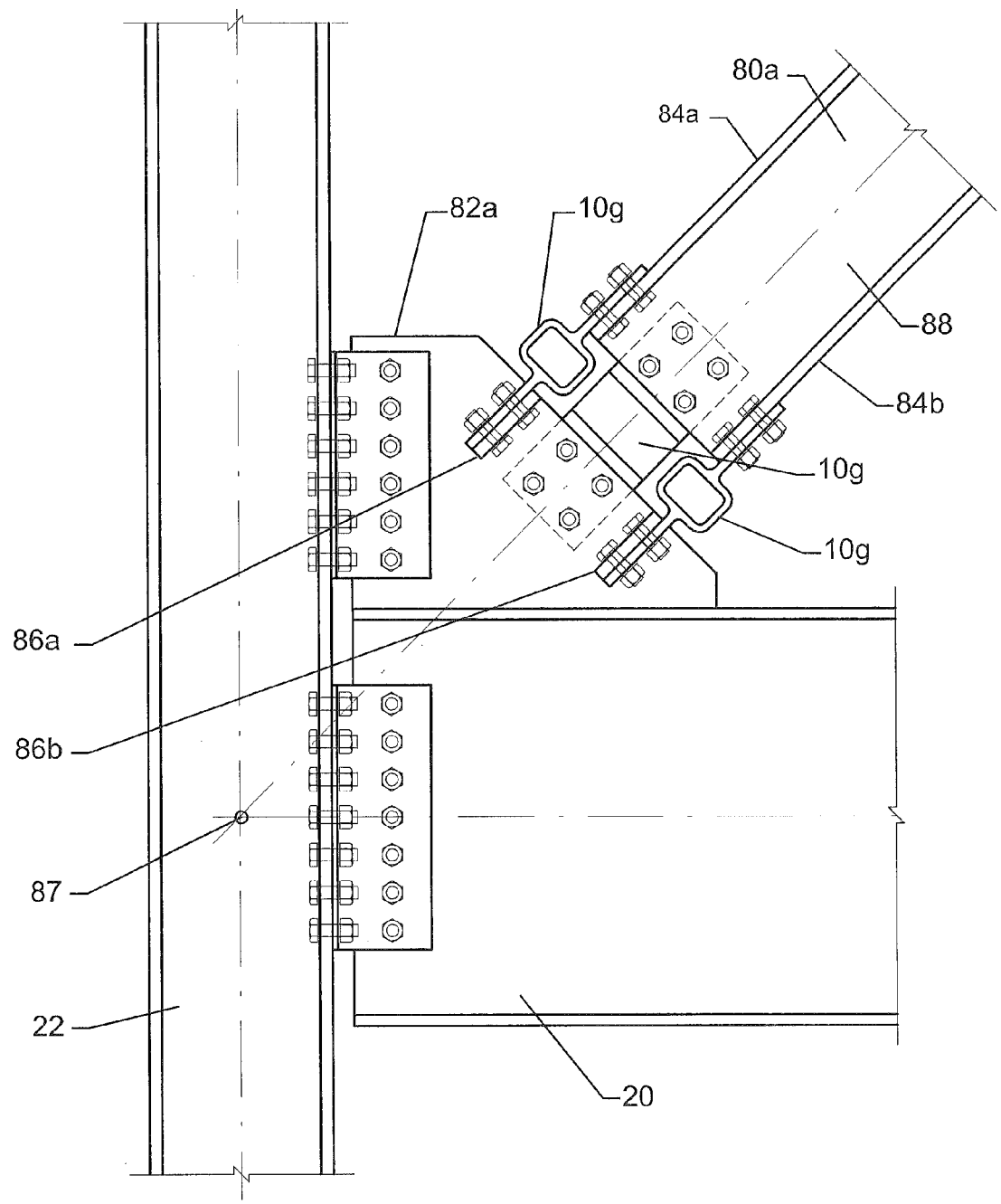
FIG. 14 is a side view of a member-to-member connection that utilizes the member-to-member connection bracket of FIG. 10 in accordance with the teachings of the present invention.

FIG. 14 illustrates an embodiment wherein connection brackets are being used in a connection of a brace member 80 to a gusset plate 82 of a connection of beam 20 to column 22. FIG. 14 illustrates three connection brackets 10g connecting brace member 80a to gusset plate 82a wherein a connection bracket 10g connects a top flange 84a of brace member 80a to gusset plate 82a using a connection tab 86a welded to the gusset plate 82a as shown. Further, another connection bracket 10g connects a bottom flange 84b of brace member 80a to gusset plate 82a using a second connection tab 86b welded to the gusset plate 82. In addition, another connection bracket 10g connects a web 88 of brace member 80a to gusset plate 82a as shown. Brace member 80 may be a wide flange beam, a tube, a C-section, angles, or other known structural shape. Column 22, beam 20, and brace member 80a intersect at an intersection point 87 which may also be considered the center of rotation when modeling the design forces. However, the exact center of rotation may be determined for any modeling or design purposes.

Figure 15:
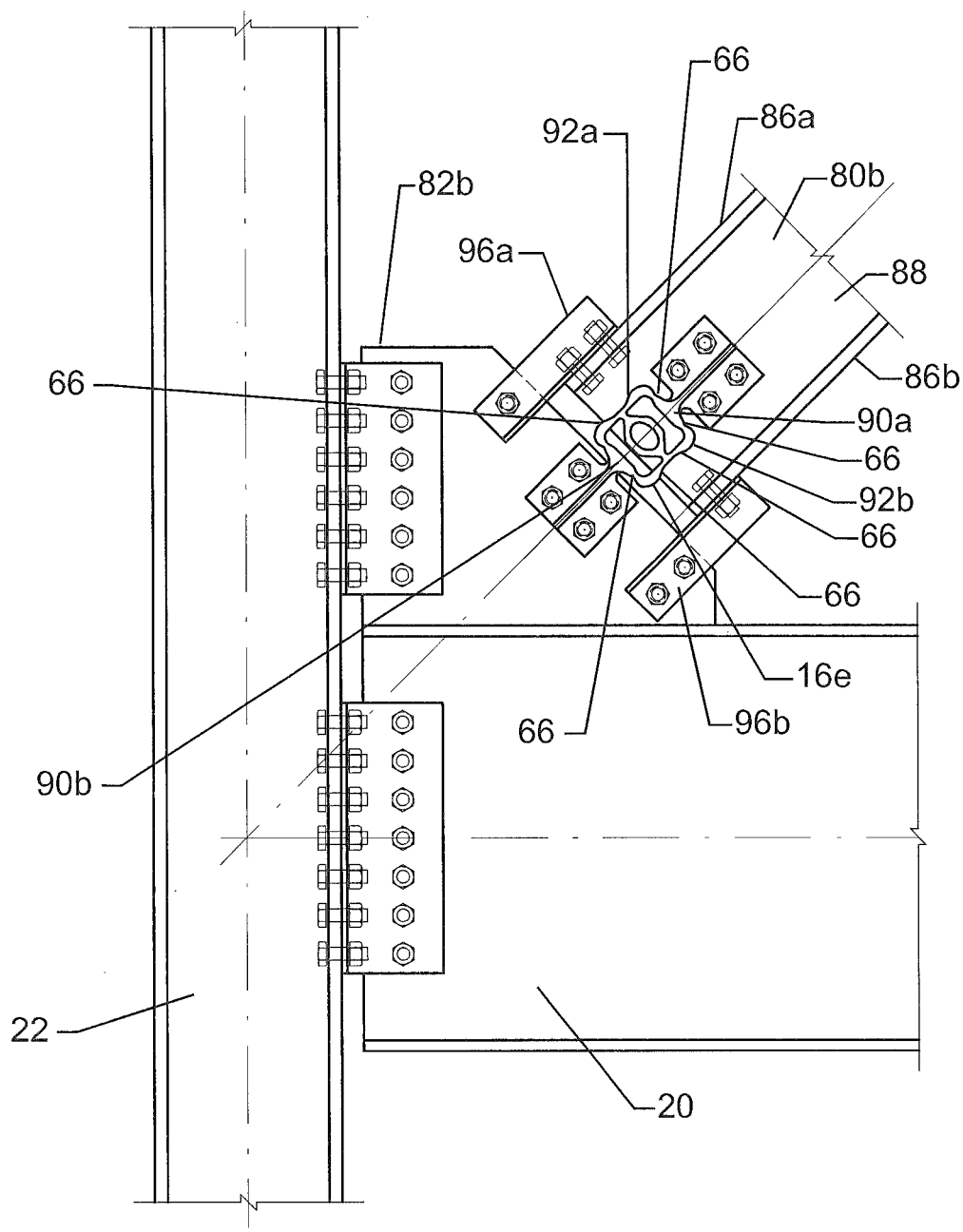
FIG. 15 is a side view of a member-to-member connection that utilizes a member-to-member connection bracket of the present invention in accordance with the teachings of the present invention.

FIG. 15 illustrates yet another example of how connection bracket 10 may be used to connect a brace member 80 to a gusset plate 82. As shown in FIG. 15, connection bracket 10j is used to connect brace 80b to gusset plate 82b. Connection bracket 10j is similar to connection bracket 10h of FIG. 11 but does not include the compression or tension stiffening elements. Connection bracket 10j includes a fuse member 16e that has a first flange fuse element 90a and a second flange fuse element 90b wherein first and second flange fuse elements 90a and 90b are opposing with a distance therebetween. Fuse member 16e further comprises a first web fuse element 92a and a second web fuse element 92b spanning between flange fuse element 90a and 90b. As shown, first web fuse element 92a may span between one end of first flange fuse element 90a and its opposing end of second flange fuse element 90b. Similarly, second web fuse element 92b may span between the other end of first flange fuse element 90a and its opposing end of second flange fuse element 90b. Web fuse elements 90 and 92 may include one or more hinge locations 66. Fuse member 16e cooperates with a first guide angle 96a and a second guide angle 96b which are fixed to gusset plate 82b and connected to brace member 80b with a slotted bolt connection to guide translation of brace member 80b in a substantially axial direction. Thus, fuse member 16e is operable to allow for inelastic hinge deformation at hinges 66 due to both axial and rotational loads resulting from the applicable structural loading.

Figure 16:
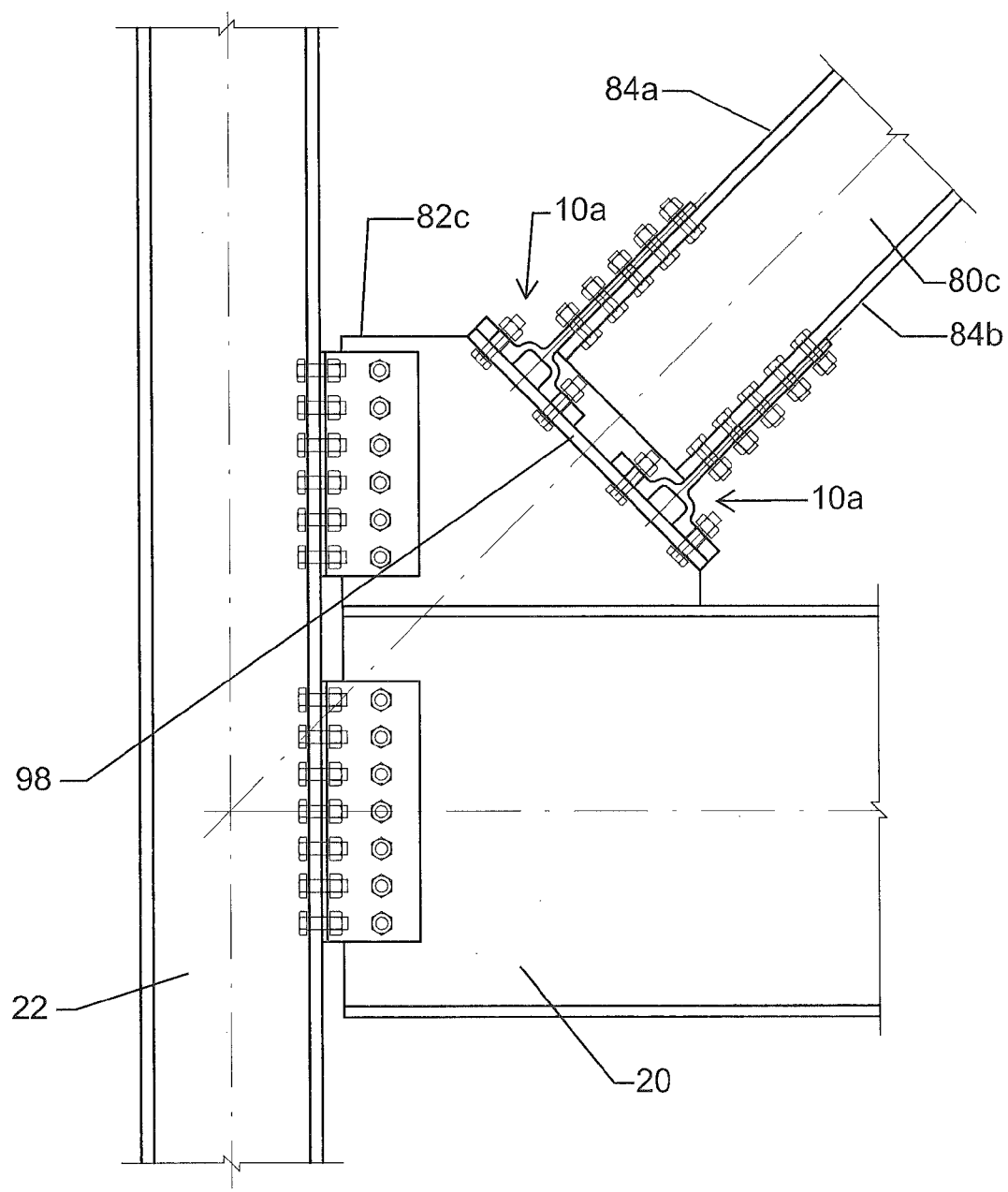
FIG. 16 is a side view of a member-to-member connection that utilizes the member-to-member connection bracket of FIG. 4 in accordance with the teachings of the present invention.

FIG. 16 illustrates yet another application of connection bracket 10 used to connect a brace member 80 to a gusset 82. As shown, connection bracket 10a is disposed to connect brace member 80c to gusset member 82c. One connection bracket 10a connects top flange 84a of brace member 80c to a connection plate 98 of gusset 82c. Another connection bracket 10a connects bottom flange 84b of brace member 80c to connection plate 98 of gusset 82c. Thus, fuse members 16a are disposed to provide inelastic deformation due to axial loads, rotational loading, or any combination thereof.

Once any embodiment of connection bracket 10 is disposed in a member-to-member connection, the function is similar in that fuse members 16 of connection bracket 10 are operable to plastically deform upon the application of a pre-determined loading condition wherein the pre-determined loading condition is less than the elastic capacity of the structural members connected. Thus, a designer may strategically implement connection brackets 10 throughout the structure to optimize building performance.

Under significant dynamic loading, the fuse members are intended to undergo inelastic deformations (primarily rotations), thereby allowing the connection members to translate and rotate with the member while the support connection elements remain stationary in relation to the member. In this way, each member may rotate and/or translate relative to the other member with all elements and members behaving substantially elastically with the exception of the fuse members. Another benefit of the plurality of plastic hinges placed into the structure is that plastic hinges absorb and dissipates static or dynamic loading to reduce the damage done to the structure.

Figure 17A:
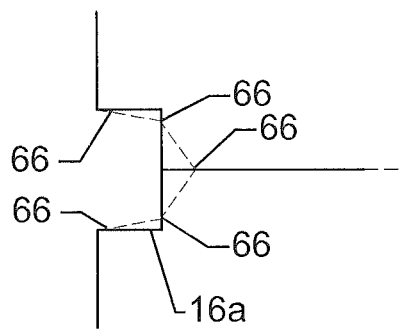
FIG. 17a is a schematic view of the hinge locations and displacement of the member-to-member connection bracket of FIG. 4 under a tensile load.
Figure 17B:
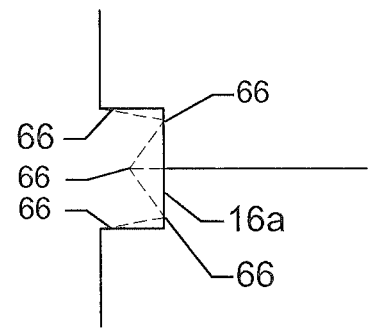
FIG. 17b is another schematic view of the hinge locations and displacement of the member-to-member connection bracket of FIG. 4 under a compression load.

FIG. 17a shows the primary deformed shape of fuse member 16a under translations away from the support wherein hinge locations 66 allow fuse member 16a to absorb the necessary deflection Δ to keep the structural members connected by connection bracket 10a in an elastic range. FIG. 17b shows the primary deformed shape of fuse member 16a under translations toward the support so as to allow fuse member 16a to absorb the necessary deflection Δ to keep the structural members connected by connection bracket 10a in an elastic range. Both 17a and 17b show that hinges 66 rotate to facilitate the required deformation Δ. Alternative translation of a structural member toward or away from the support gusset plate may additionally or alternatively occur under moment (rotation) in the brace and or the dynamic response of the structure under a loading condition.

Similar inelastic rotation of fuse elements of the additional embodiments of connection bracket 10 will perform similarly and allow the fuse elements to absorb the dynamic loading prior to failure or inelastic behavior of structural members connected. One substantial benefit of the present connection bracket 10 is that upon experience of a significant loading event such as a hurricane, earthquake, explosion, or the like, connection bracket 10 may absorb and experience all of the inelastic behavior necessary to absorb, dissipate and respond to the loading event. As such, after such an event, in most cases the building may be reconditioned by replacing the yielded connection brackets as opposed to replacing the entire structure. This results in the potential for significant economic savings.

Although examples are described herein with respect to a monolithically cast bracket, any process for assembling a bracket with similar geometric characteristics may be used. Further, while examples are described with respect to one or more specific types of loading such as seismic loading, the described connections and structural devices can be used for other types of loading such as but not limited to blast, wind, thermal, gravity, soil loads, including those resulting from soil displacements, and the like.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

We claim:
1. A member-to-member connection bracket comprising:
 a first connection member for coupling said connection bracket to a first structural member, where said first connection member comprises a web connection member;

a second connection member for coupling said connection bracket to a second structural member, where said second connection member comprises at least one flange connection member;

a fuse member disposed between said first connection member and said second connection member, said fuse member being operable to deform upon application of a pre-determined loading condition;

said fuse member comprises at least a first flange fuse element, a first web fuse element coupled to said first flange fuse element and a second web fuse element coupled to said first flange fuse element;

said web connection member intersects proximate a middle of said first flange fuse element and said connection bracket is of unitary construction and comprises a "Y"-shape.

2. The member-to-member connection bracket of claim 1 wherein said fuse member includes at least one hinge location, said hinge location providing inelastic deformation at a pre-determined load.

3. The member-to-member connection bracket of claim 2 wherein the hinge location comprises a reduced thickness.

4. The member-to-member connection bracket of claim 2 wherein said pre-determined load is less than the elastic yield load of a first structural member and a second structural member.

5. The member-to-member connection bracket of claim 2 wherein the load comprises a dynamic load.

6. The member-to-member connection bracket of claim 1 wherein the web connection member is skewed relative to said flange connection member.

7. The member-to-member connection bracket of claim 1 wherein said flange fuse elements and said web fuse elements partially define a void, wherein said void is filled with a material that is one of elastomeric, fiber reinforced polymer, concrete, cementitious, and piezoelectric to provide one of increased elastic stiffness, inelastic stiffness, and damping.

8. The member-to-member connection bracket of claim 1 further comprising a second flange fuse element wherein said first web fuse element is coupled to an end of said first flange fuse element and an opposing end of said second flange fuse element and said second web fuse element is coupled to another end of said first flange fuse element and an opposing other end of said second flange fuse element.

9. The member-to-member connection bracket of claim 8 wherein said first connection member comprises a first web connection member and said second connection member comprises a second web connection member.

10. The member-to-member connection bracket of claim 8 wherein said first web connection member and said second web connection member are orientated at an angle that is less than one-hundred eighty (180) degrees.

11. The member-to-member connection bracket of claim 8 wherein a radius of the transition between the web fuse and flange fuse elements is proportioned to create a substantially circular or elliptical fuse element connecting the first web connection member and the second web connection member.

12. The member-to-member connection of claim 1 wherein the fuse member has a tubular cross-section.

13. The member-to-member connection of claim 12 wherein the fuse member has a circular cross-section.

14. The member-to-member connection of claim 1 wherein said first structural member is one of a beam or brace and said second structural member is one of a column or gusset.

15. The member-to-member connection bracket of claim 1 wherein said flange connection member is a single member coupled to said first web fuse element and said second web fuse element.

* * * * *